Aug. 31, 1926.
A. D. HADSEL
1,598,519
SURVEYING INSTRUMENT
Filed Sept. 19, 1923 2 Sheets-Sheet 2
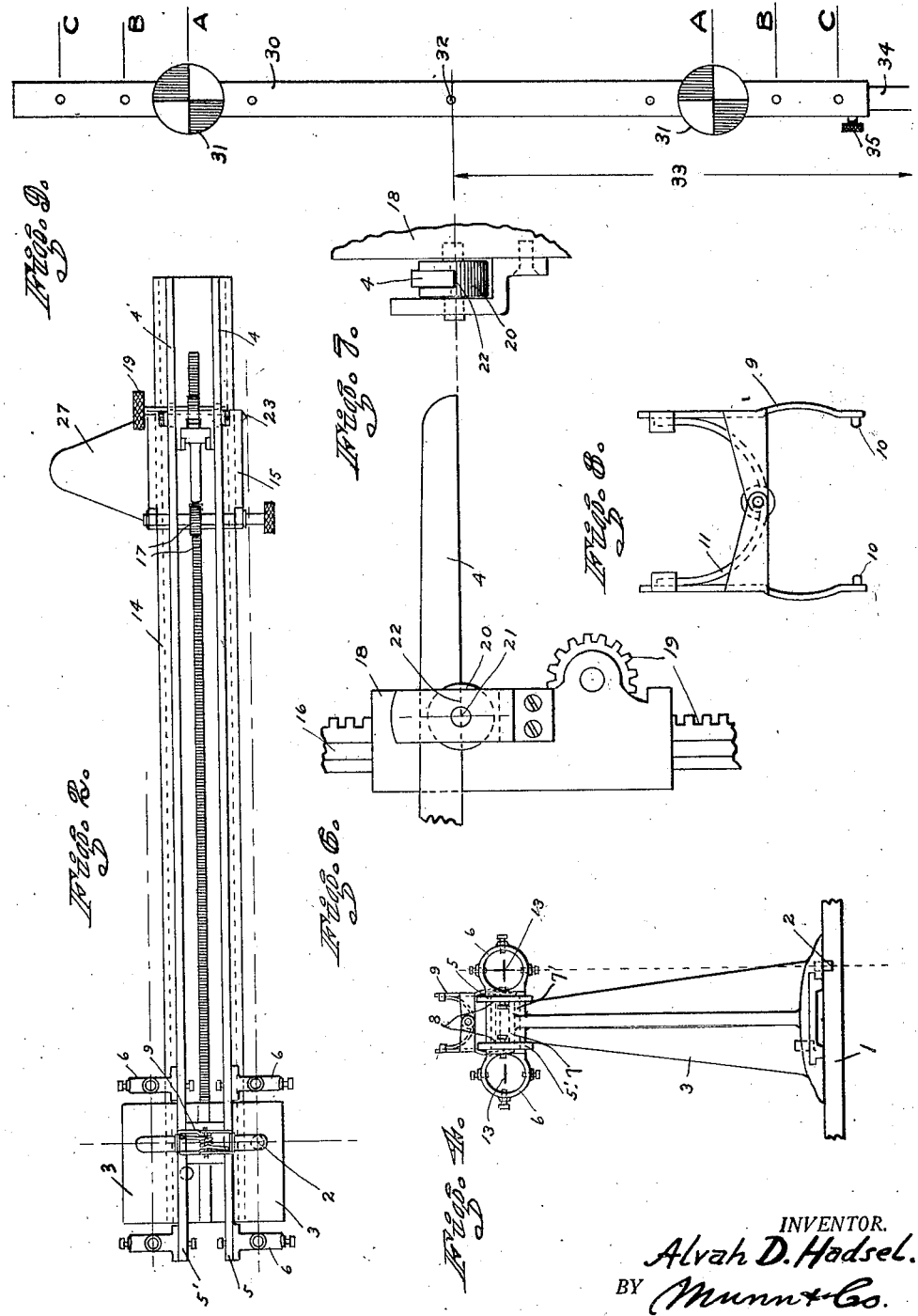
INVENTOR.
Alvah D. Hadsel.
BY Munn & Co.
ATTORNEYS.

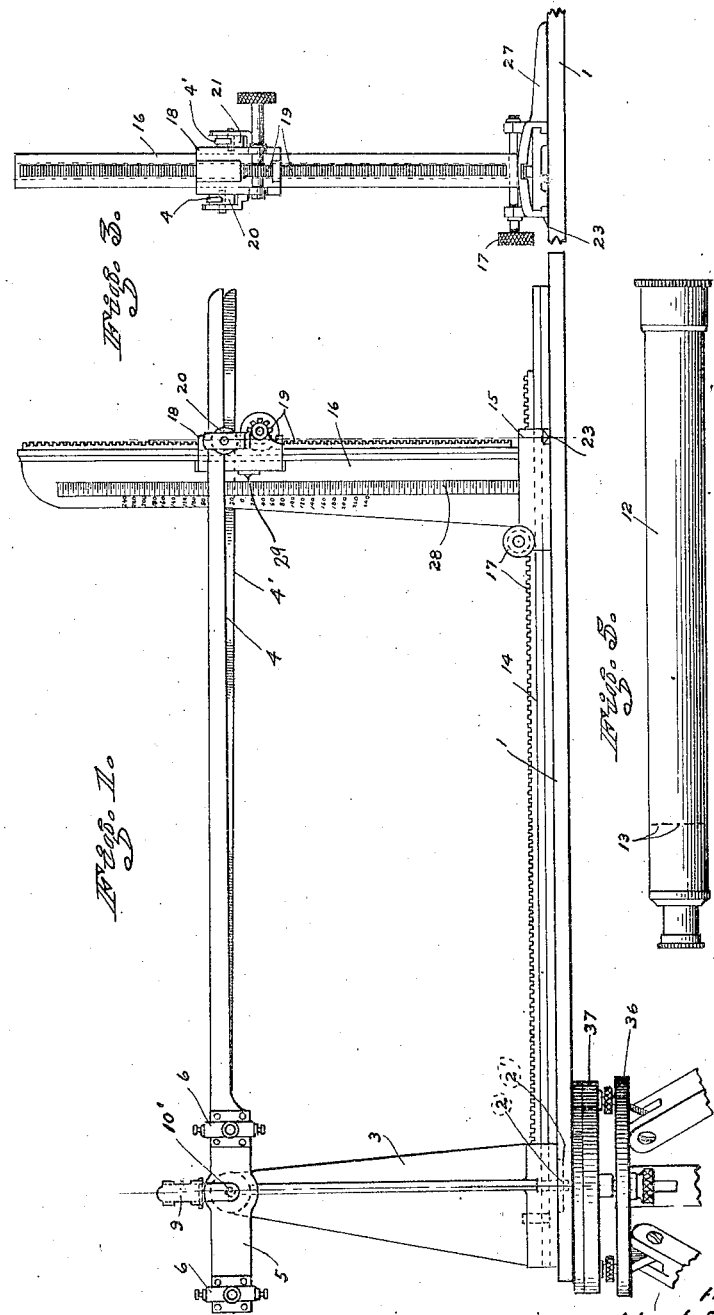

Patented Aug. 31, 1926.

1,598,519

UNITED STATES PATENT OFFICE.

ALVAH D. HADSEL, OF SAN FRANCISCO, CALIFORNIA, ASSIGNOR OF ONE-HALF TO FREDERICK N. WOODS, JR., OF SAN FRANCISCO, CALIFORNIA.

SURVEYING INSTRUMENT.

Application filed September 19, 1923. Serial No. 663,710.

My invention relates principally to a system of stadia surveying and graphic plotting, and has for its objects certain improvements over the apparatus shown and described in my earlier Patent No. 1,428,028 issued September 5, 1922. Amongst the improvements effected are: a binocular instrument of greater precision, and longer range; no exposed or movable stadia hairs; larger or smaller scale drawing with same length of instruments, and other features.

These objects are secured in the apparatus shown in the drawings and in which:

Figure 1 is a side elevation of my instrument proper but with telescopes omitted and in place on a plane table;

Figure 2 is a plan view of Figure 1 omitting the table;

Figure 3 is an elevation of the front end of the instrument as seen in Figure 1, and Figure 4 the rear end;

Figure 5 is a representation of a telescope of which two are used in the instrument;

Figure 6 is an enlarged side view detail of one of the straight edge slides, Figure 7 being a front view of same;

Figure 8 is an enlarged detail of the spring clamps for holding straight edges and telescopes to the pedestal of the instrument;

Figure 9 is a front view of the special stadia rod used with my instrument or system;

In taking up the detailed construction of my instrument, the theory of its use and principle of its projecting the graphic representation to the plane table need not be gone into as this was discussed in my former patent mentioned and is the same for this instrument except as noted hereinafter.

The chief difference in this over my former instrument is, that instead of providing one fixed peep hole and a pair of spaced and longitudinally movable stadia wires, I provide two complete telescopes pivotally arranged side by side, one for the use of each eye, each with a fixed and centralized transverse hair and one of the telescopes having also a vertical cross hair, the vertical hair being in the telescope forming the center of the system. These hairs are within the ininstruments at the objective focal points as usually placed in surveyors' telescopes, and the telescopes while parallel as projected upon a horizontal plane, are pointing one up and one down at a slight divergence forward, so that they separately sight along the paths of the upper and lower hairs respectively of my former device mentioned, though the hairs themselves at the former location are dispensed with, and in their position is placed a pair of sliding blocks acting on the respective telescope axes for varying the divergence of the telescopes for aligning the stadia rod targets.

In Figure 1 the plane table is indicated at (1) and pivoted at (2) to a plate (2') set therein in a pedestal (3). The pedestal supports at its upper end two parallel metal straight edges (4)—(4'), projecting forwardly. These straight edges are tapering blades placed on edge and having enlarged rear ends (5) provided with screw adjusting yokes (6) at the outer sides of the blades into which a pair of telescopes is adapted to be clamped, one on each blade. The telescopes are adjustable by means of the yoke screws to optically aline with their respective straight edges, also laterally to suit the eye separation of the user. The pedestal has a transverse bore in its upper hub in vertical alinement with the pivot (2) and each blade has secured to it a laterally projecting tubular trunnion (7)—(7'), one fitting within the other and the outer one within the bore so that they may be moved independently in vertical arcs, side by side, and the telescopes when secured within the yokes will partake of the movement.

To hold the blades tightly against the sides (8) of the hub of the pedestal a spring clamp (9) is snapped over the outsides of the two blades, projecting between them and the telescope bodies. The clamp preferably has small tits (10) to center in small holes (10') in the pivotal center of each blade so it will not fall off.

Figure 8 shows the clamp removed from the blades and its construction will be readily understood, a wire spring (11) serving to draw the sides together. The construction of the clamp is unimportant as any means which will resiliently hold the blades to the hub ends will suffice.

The telescopes which attach to the blades are as shown in Figure 5, at (12), having preferably terrestrial lens systems and with fixed centralized horizontal stadia hairs at the focal points as indicated at (13) in Fig. 4. One of the telescopes has also a vertical hair so that when the telescopes are mounted on the blades, the hairs take the positions indicated at (13) in Figure 4, the crossed hairs, it will be observed, being in the telescope over the pivot (2) with the vertical hair in alinement therewith.

Extending from the lower part of the pedestal is an arm (14) carrying at its outer end a sliding carriage (15) having an upright (16). The carriage carrying the upright is movable along the arm by means of the rack and pinion indicated at (17) so that it may be adjusted back and forth upon the arm, and the arm only, or block only, or both may rest upon the table as shown.

The upright (16) is integral with the carriage (15) or firmly secured thereto, and is provided with a vertically sliding head (18) which may be adjusted up and down by the rack and pinion indicated at (19). On both sides of the sliding head are arranged trunnion blocks (20), slidably supporting, respectively, the free ends of the straight edges (4), (4') so that when the carriage (15) is adjusted along the arm (14) the straight edges will slide along the blocks and when the head (16) is raised or depressed the trunnions will swivel to hold the straight edges in contact with their sliding surface.

As shown in Figures 6 and 7 each block (20) has on opposite faces thereof trunnions (21) which are revolvably supported by the upright (16) and each trunnion is slotted at (22) to slidably receive one of the straight edges. The slots in the trunnion blocks extend exactly to the center of the trunnion pivots (21) and the two blocks are vertically in line and spaced one above the other a definite distance in relation to the scale of graphic plot to be made, this separation having the function of the spaced stadia hairs in the instrument described in my former patent mentioned.

The sliding surfaces of the straight edges which slide in the blocks are each in line with the longitudinal axis of the telescope which it supports, so that in effect the telescopes bear on their optical axes upon the blocks, and since the axes are supported at an outwardly diverging angle any adjustment of the carriage (15) along the arm (14) changes the angle of the axes.

Vertically beneath the trunnion blocks and in line with the optical center of the near or cross hair telescope is the plot indicating center (23). This may be a pointer bearing on the plane table as indicated in Figure 2 of the drawing.

The instrument turns on the table around the pivot (2), and the arm (14) has preferably a stabilizing pad at its outer end as shown in Figure 2 at (27).

The height of the instrument is considered the center of the transverse pivot (10') about which the straight edges swing and at which point the longitudinal axes of the telescopes meet or cross.

On the upright (16) is a scale of elevation (28) against which moves a pointer (29) on the sliding head (18). This scale of elevation is preferably graduated in feet from a zero point each way, thus giving a direct reading in feet at all points of the plot, the zero being taken when the center of the projected angle of the telescopes (the point midway between the trunnion axes) is level with the center (10') of the instrument, though any other point may be taken as zero, or the upper or lower side of the angle if desired.

If the center of the angle is chosen I arrange my stadia rod (30) as shown in Figure 9, with two targets (31), both adjustable away from a common center (32) to any desired points A, B or C for changing the scale relation of the plot. To maintain the height (33) from center to end of rod equal to the height of the instrument I provide an extensible lower end (34) clamped by the screw (35).

In operation the plane table is preferably secured as shown in Figure 10 to the top of a revolving head tripod (36) having a graduated circle as indicated at (37) so that the angular positions of the various plottings may be read, though in making the plot on the table the instrument only is turned on the table on its pivot (2) to bring the vertical hair centered over the vertical center of the rod; then with an eye at both telescopes the observer rocks the sliding carriage back and forth or changes the elevation of the sliding head until the horizontal hairs bisect, respectively, the upper and lower targets, at which time the indicating center (23) denotes the correct position on the plot and the vertical scale (28) the correct elevation.

Having thus described my instrument and outlined its improvements over my former device, it will be seen that while I described a binocular instrument employing complete telescopes, it might be mentioned that telescopes may be used with or without a lens system by simply keeping the stadia hairs as far from the eye as possible.

I claim:

1. In a surveying instrument of the character described, a frame rotatable about a fixed vertical axis, spaced uprights on said frame, a pair of telescopes, means mounting said telescopes on a common horizontal axis on one upright, said means projecting forwardly toward the other upright, and means on the latter upright engaging said supporting means for raising and lowering the projecting ends of the telescopes.

2. In a surveying instrument of the character described, a frame rotatable about a fixed vertical axis, spaced uprights on said frame, a pair of telescopes, means mounting said telescopes on a common horizontal axis on one upright, means on the latter upright engaging said mounting means for raising and lowering the projecting ends of the telescope, said mounting means including straight edges to which the said telescopes are respectively secured, said straight edges being axially alined with the telescope and disposed in spaced relation upon the support.

3. In a surveying instrument of the character described, a frame rotatable about a fixed vertical axis, an upright disposed at one end portion of the frame, a second upright slidably connected to the frame, means for adjusting the slidable upright toward and away from the first named upright, a pair of telescopes, means mounting said telescopes on a common horizontal axis on the first named upright, said means including straight edges extending to the slidable upright, and means on the slidable upright for operating the straight edges to raise and lower the telescopes.

ALVAH D. HADSEL.